Nov. 20, 1928.
L. J. SWARTZ
VEHICLE SPRING TIRE
Filed May 21, 1926
1,692,711
3 Sheets-Sheet 1
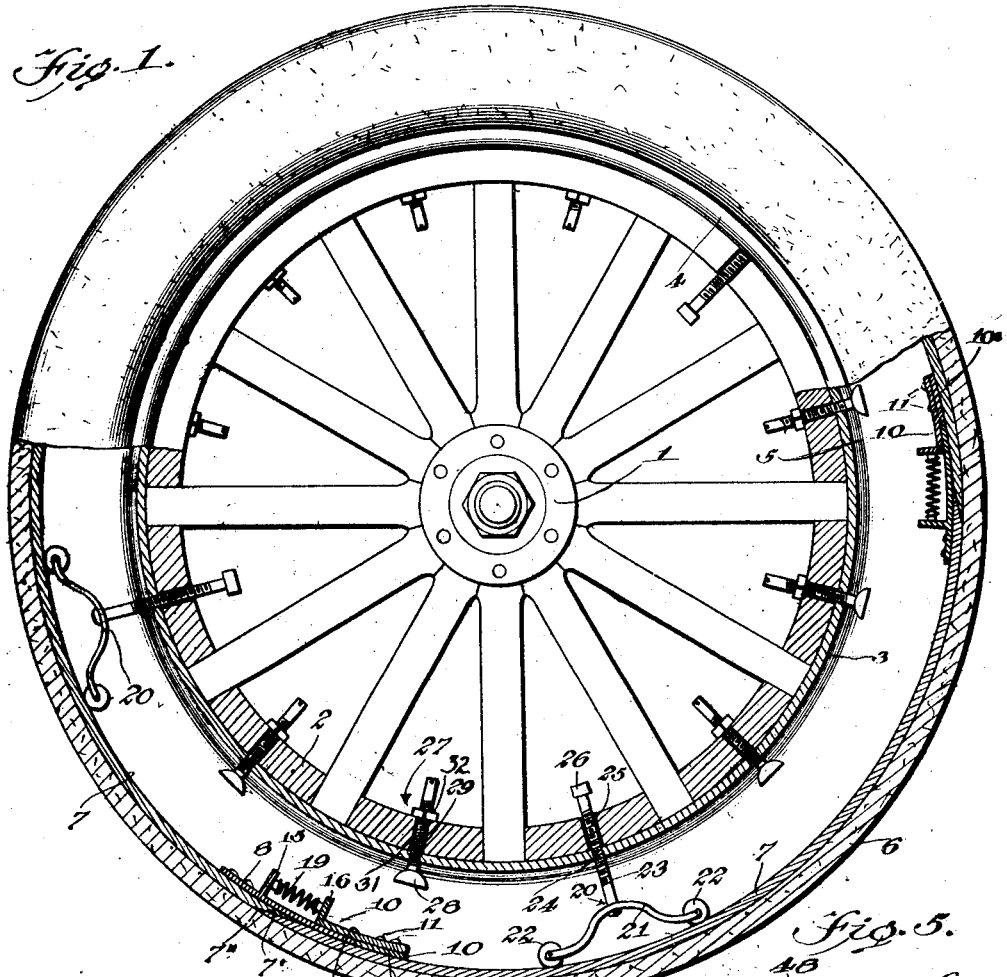
INVENTOR
L. J. Swartz,
BY
ATTORNEYS

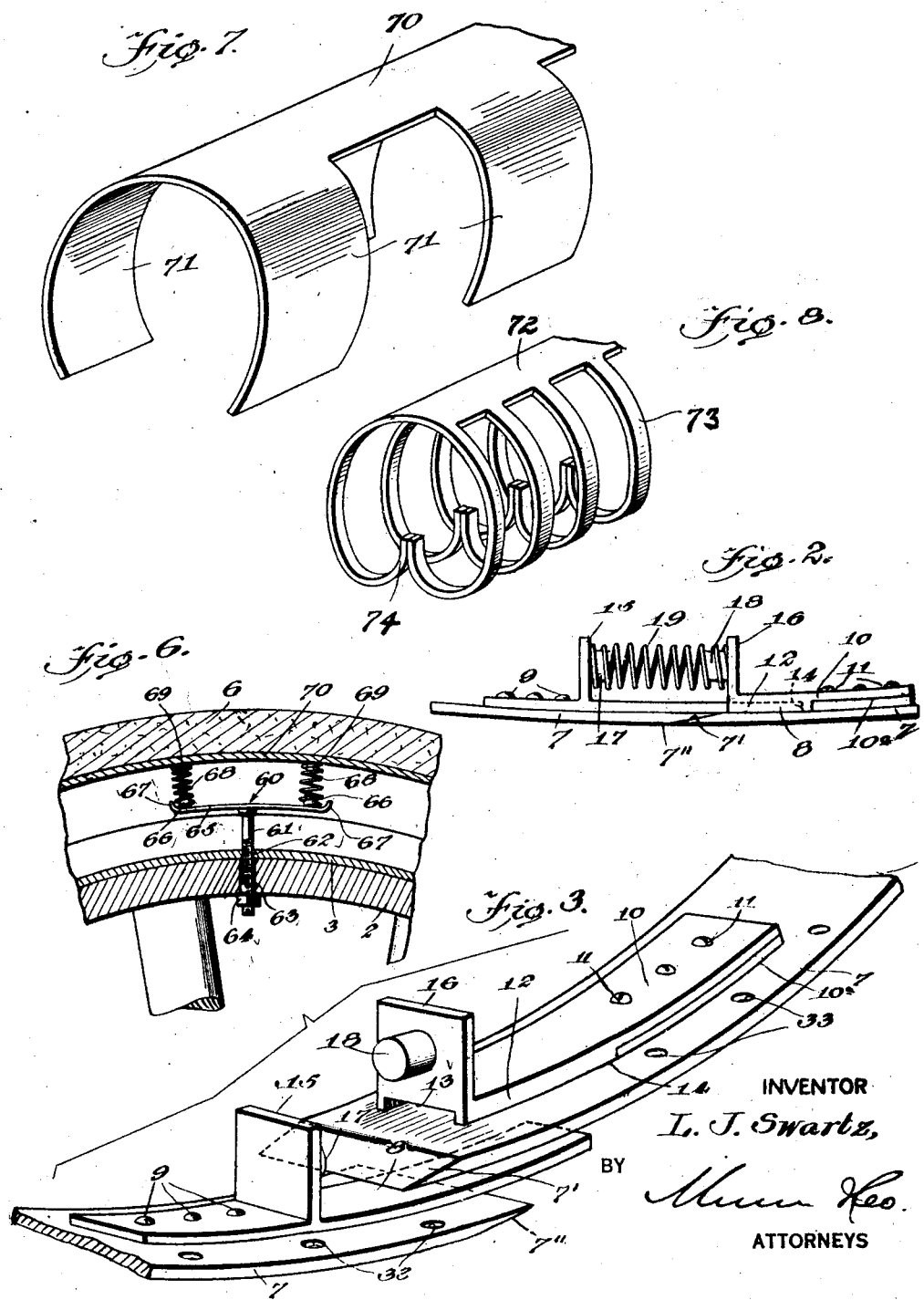

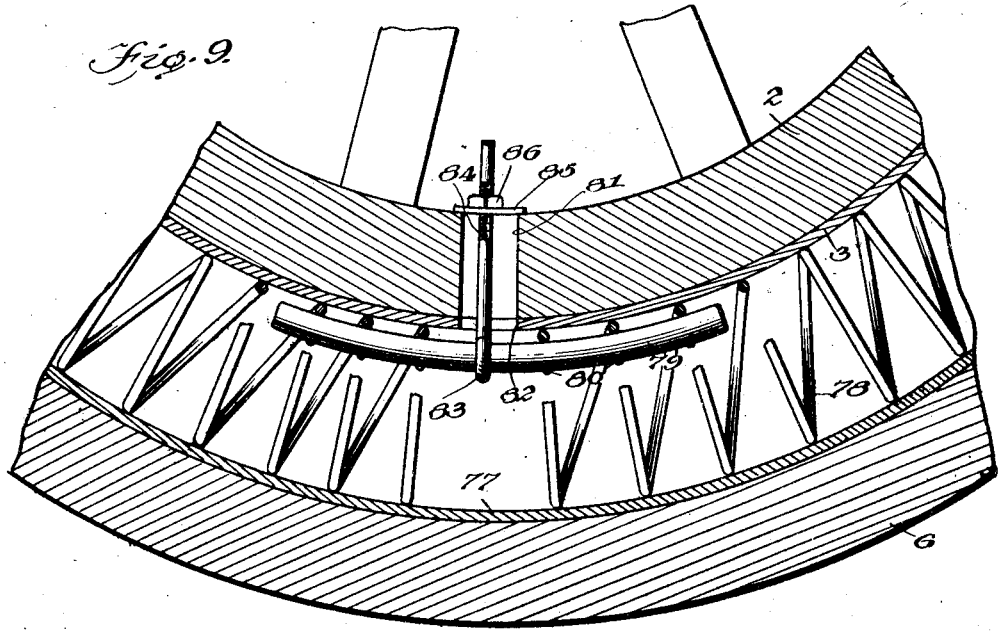
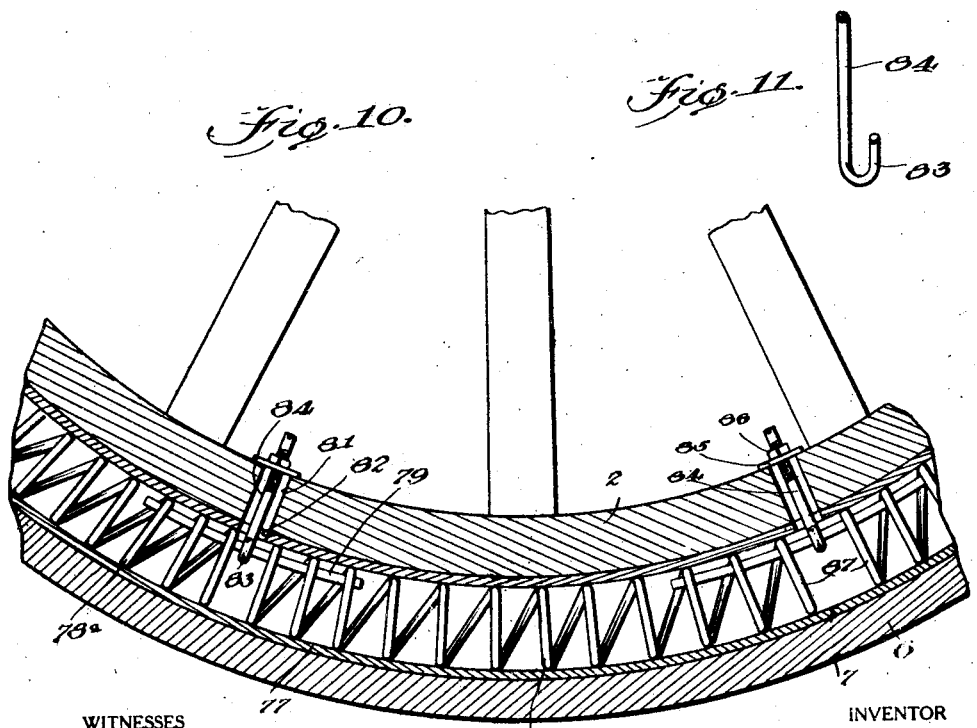

Patented Nov. 20, 1928.

1,692,711

UNITED STATES PATENT OFFICE.

LITCH J. SWARTZ, OF WENATCHEE, WASHINGTON.

VEHICLE SPRING TIRE.

Application filed May 21, 1926. Serial No. 110,726.

My invention relates to improvements in vehicle spring tires of that type of construction which affords facilities for cushioning a wheel against shocks and jars on the periphery thereof without the use of the usual pneumatic inner tube, and it consists in the combinations, constructions and arrangements herein described and claimed.

An object of the invention is the provision of a spring tire of the character described which comprises reliable, effective and conveniently adjustable means for compressing a tire-casing resiliently on the rim of the vehicle wheel.

A further object of the invention is the provision in a tire of the character described of novel tire casing supporting means which comprises a plurality of cooperative elements, any one of which can be readily replaced at slight cost if required.

A still further object of the invention is the provision in a spring tire of the character described of means for positively preventing circumferential slipping or other displacement of the spring supported outer casing of the tire.

Other objects and advantages of the invention will be apparent from the following description, considered in conjunction with the accompanying drawings, in which Figure 1 is a view of a vehicle wheel equipped with a spring tire embodying the invention, the view being mainly in side elevation with portions of the wheel rim and tire structures broken away and other portions shown in section, Figure 2 is a fragmentary edge view of the meeting ends of adjacent sections of a tire casing supporting spring ring which is comprised in the device, Figure 3 is a fragmentary perspective view showing the meeting end portions of adjacent sections of the tire casing supporting spring ring spaced apart and showing the cooperative guiding and retaining elements on said meeting end portions of the adjacent sections of said ring.

Figure 4 is a transverse vertical section through the wheel rim and through a modified form of tire casing supporting structure, Figure 5 is a fragmentary sectional view, taken at right angles to Figure 4, showing portions of the wheel rim and spring ring structures of Figure 1, and showing a modified form of spring expander for the tire casing supporting ring, Figure 6 is a view similar to Figure 5, showing another modified form of expander for the tire casing supporting ring, Figure 7 is a fragmentary perspective view of a modified form of tire casing supporting ring, Figure 8 is a view similar to Figure 7, showing another modified form of tire casing supporting ring, Figure 9 is a fragmentary sectional view similar to Figure 5, showing a further modification, Figure 10 is a view similar to Figure 9, showing a still further modification, and Figure 11 is a fragmentary perspective view of a hook rod which is used in the modification shown in Figs. 9 and 10.

In Figure 1, the numeral 1 designates a wheel which includes a felly 2 having a rim 3 mounted thereon in any suitable known manner. The rim 3 is provided with the usual rim flanges 4 at the edges thereof for engaging with the beaded edge portions 5 of a tire casing 6 of the clincher type of construction. The parts which have been described so far are ordinary in construction and form no part of the present invention except in so far as they cooperate with the parts which will now be described.

In carrying out the invention, I provide a supporting spring ring which fits within the tire casing 6 against the inner periphery of the latter and cooperates with other elements which will be presently described to space the peripheral portion of the tire casing 6 resiliently from the rim 3. This tire casing supporting ring may comprise a plurality of cooperative sections 7, each of which is curved arcuately longitudinally thereof to conform to the curvature circumferentially of the inner peripheral wall of the tire casing 6, as clearly shown in Figures 1 and 5. Each section 7 also is curved arcuately transversely thereof to conform to the transverse curvature of the inner peripheral wall of the tire casing 6, as best seen in Figure 4.

Each section 7 of the tire casing supporting ring is beveled at its inner side at one end thereof as indicated at 7' and is complementarily beveled at its outer side at the opposite end thereof, as indicated at 7'', the respective sections 7 of the tire casing supporting ring being relatively arranged so that the beveled end portion 7' of each section may slide in contact with the beveled end portion 7'' of the adjacent section, whereby the tire casing supporting ring may be expanded and contracted circumferentially within limits while the adjacent ends of adjacent sections of the ring are in contact with each other without deformation of the supporting ring and without appreciable weakening of the supporting ring at the joints between adjacent sections of the ring. The end portion of each section 7 which is beveled at its outer side carries a reinforcing, guiding and retaining plate 8 which is of less width than the section 7 and is secured by rivets 9 or like fastening devices to the section 7 against the inner peripheral face of the latter so that the plate 8 disposed midway between the side edges of the section 7 and the end portion of the plate 8 extends beyond the corresponding end of the section 7. A plate 10, is supported by a plate 10ª on the opposite end portion of the section 7 on the inner periphery of the latter and midway between the side edges of the section 7, as my means of rivets 11 which fasten both the plates 10 and 10ª to the section 7. The plate 10 may terminate at its outer end short of the corresponding end of the supporting section 7 but beyond the outer end of the plate 10ª which has a thickness slightly greater than the thickness of the extending end portion of the plate 8, thus producing a socket at 13 between the outer end portion of the plate 10 and an end portion of the section 7 for the reception of the extending end portion of the plate 8 on the adjacent end of the adjacent section 7 of the tire casing supporting ring. The plate 10ª is shouldered as at 14 at the inner end of the socket 13 formed between the side flanges 12 so that the outer end of the extending end portion of the plate 8 on the adjacent section 7 will engage in the socket 13 and abut the shoulder 14 at the time the complementarily beveled end portions 7' and 7'' at ends of adjacent sections 7 are completely lapped. When these parts are so engaged, the flanges 12 on the extending end portion of the plate 10 at the sides of the socket 13 will prevent lateral displacement of the plate 8 relatively to the plate 10. When the extending end portions of the plates 8 on the respective sections 7 are in contact with the shoulders 14 at the inner ends of the sockets 13, the tire casing supporting ring will be in its fully contracted position. Each plate 8 is formed intermediate its length with an inwardly extending radial lug 15 and the outer end portion of each plate 10 is formed at its extremity with an inwardly extending similar radial lug 16. Stud projections, such as indicated at 17 and 18, may be formed on the outer or confronting faces of the adjacent lugs 15 and 16. A compression spring 19 may be disposed between adjacent lugs 15 and 16, the opposite end portions of the compression spring overlapping and engaging with the stud projections 17 and 18, whereby the compression spring 19 will be held against accidental displacement from position between adjacent lugs 15 and 16. The compression springs 19 urge adjacent sections 7 of the tire casing supporting ring apart when the tire casing supporting ring is in its fully contracted position and thus tend to expand the tire casing supporting ring against the inner periphery of the tire casing 6.

The invention contemplates the provision of additional devices for expanding the casing supporting ring against the inner peripheral wall of the casing 6 and for adjustably supporting the casing supporting ring on the rim 3 in spaced concentric relation to the latter. Such additional expanding and supporting means may comprise a plurality of devices spaced circumferentially about the rim 3 and each having the construction indicated generally at 20 in Fig. 1. Each of the devices 20 may comprise an arcuately curved or semi-elliptic spring 21 having rollers 22 on the ends thereof in contact with the inner wall of a section of the tire casing supporting ring, the convexly curved face of the spring member 21 being turned inward and the rollers 22 at the ends of the spring member 21 being in contact with the inner face of a section 7 of the tire casing supporting ring at circumferentially spaced points along the longitudinal median line of the tire casing supporting ring. An adusting rod 23 is swivelly connected with the associated spring member 21 intermediate the length of the latter and at the outer end of the adusting rod. The adjusting rod 23 extends radially inward and is provided with screw threads for engaging with a screw threaded radial opening 24 in the rim 3. The felly 2 is provided with a radial opening 25 in alignment with the opening 24 in the rim 3 so that the adjusting rod 23 may extend inwardly of the felly and be provided at its inner end with suitable means, such as the non-circular enlargement indicated at 26, whereby the adjusting rod can be engaged by a suitable tool and turned to vary within limits the expansive force of the spring member 21.

The edge portions of the tire casing 6 are clamped against the wheel rim by a plurality of circumferentially spaced clamping devices generally indicated at 27. Each of these clamping devices 27 comprises a block 28 having a length greater than the distance between the beaded edge portions 5 of the tire casing and having a width which may be slightly less than the distance between the edge portions of the tire casing. Each block 28 has the inner face thereof curved longitudinally thereof as indicated at 28ª to conform to the transverse curvature of the inner faces of the inner edge portions 5 of the tire casing. The outer end portion of a screw threaded rod 29 is connected with the associated block 28 intermediate the length of the latter and extends through a radial opening 30 in the rim 3 and also through a radial opening 31 in the felly 2. A nut 32 being in threaded engagement with the inner end portion of the rod 29 and is adapted to be tightened on the rod 29 to draw the clamping block 28 toward the rim 3 so that the end portions of the clamping block 28 will force the beaded edge portions 5 of the tire casing 6 against the rim 3 and against the rim flanges 4, thus positively preventing accidental displacement of the edge portions of the tire casing.

From the foregoing description of the various parts of the device, the operation thereof may be readily understood. The adjacent end portions of adjacent sections 7 of the tire casing supporting ring may have longitudinally spaced openings 33 formed therein, with which relatively movable elements of a suitable tool, not shown, may be engaged for expanding the tire casing supporting ring initially within the tire casing as required to cause the extending end portions of the plates 8 to slip into place in the associated sockets 13. The rods 23 then are turned to expand the tire casing supporting ring as required to produce a desirable spring pressure on the inner periphery of the tire casing 6. The nuts 32 then are tightened to secure the blocks 28 in positions to clamp the edge portions of the tire casing against the rim 3 and the rim flanges 4. The blocks 28 may be conveniently inserted between the edge portions of the tire casing 6 when these blocks are turned at right angles to the position shown in Figure 4.

With the construction which has been described shocks and jars against the tread portion of the tire casing 6 will be absorbed without being transmitted to the hub of the wheel. The outer surface of the tire casing supporting ring conforms to both the circumferential and transverse curvature of the inner periphery of the tread portion of the tire casing and therefore no undue wear on the tire casing will result by reason of the supporting of the tire casing in spaced concentric relation to the rim 3 in the manner hereinbefore described. The hereinbefore described parts can be replaced at slight cost if required for any cause.

As shown in Figure 4, the tire casing supporting ring may comprise a plurality of concentric spring members as indicated at 7ª, 7ᵇ and 7ᶜ, respectively. The hereinbefore described rollers 22 will then be disposed against the inner periphery of the inner ring member 7ᶜ.

In lieu of the ring expanding and supporting devices 20, I may use a plurality of ring expanding and supporting devices as indicated generally at 40 in Fig. 5 or a plurality of ring expanding and supporting devices as shown in Fig. 6 and indicated generally at 60. Each of the devices 40 comprises an adjusting rod 41 in threaded engagement with a radial opening 42 in the rim 3. The inner end portion of the rod 41 extends through a radial opening 43 in the felly 2 and the inner end of the rod 41 may be formed with a slot adapted to be engaged by the blade of a screw driver, whereby the rod 41 can be turned in the opening 42. A lock nut 44 may be screwed on the inner end portion of the rod 41 into the opening 43 and against the inner face of the rim 3. The outer end portion of the rod 41 is swivelly connected with a substantially cup-shaped socket plate 45 in which the inner end portion of a compression spring 46 of coiled formation is received. The tire casing supporting ring of the construction shown in Figure 5 is indicated at 47 and may be formed with inwardly extending radial stud projections 48 corresponding in number and relative arrangement with the devices 40. The base of the plate 45 also may have an outwardly extending stud projection 49 and the outer end portion of the spring 46 encircles the stud projection 48 while the inner end portion of the spring 46 encircles the stud projections 49, whereby the spring 46 will be held effectively against accidental lateral displacement from position between the socket plate 45 and the inner face of the tire casing supporting ring 47. The tire casing supporting ring 47 otherwise may be identical in construction with the tire casing supporting ring shown in Figures 1 and 2.

The expanding and supporting device 60 shown in Figure 6 comprises an adjusting rod 61 in threaded engagement with a radial opening 62 in the rim 3, the inner end portion of the rod 61 extending through a radial opening 63 in the felly 2 and being engaged with a lock nut 64. The inner end of the rod 61 may have a slot adapted to be engaged by the blade of a screw driver. The outer end portion of the rod 61 is swivelly connected to the middle portion of a plate 65 which is of greater length than width and is provided adjacent to each of the opposite ends thereof with an outwardly extending stud projection 66. The extremities of the plate 65 are curved radially outward as indicated at 67 to cooperate with the stud projections 66 to prevent accidental displacement of the inner end portions of the compression springs 68, the inner end portions of the compression springs 68 encircling the stud projections 66 and being prevented from moving appreciably toward the ends of the plate 65 by the outturned end portions 67 of said plate. The outer end portions of the springs 68 encircle inwardly extending stud projections 69 on a tire casing supporting ring 70 which otherwise may be identical in construction with the tire casing supporting ring shown in Figures 1 and 2.

A modified form of tire casing supporting ring is partially shown in Figure 7 and may comprise a peripheral portion 70 which is curved arcuately both circumferentially and transversely to conform to the curvature of the inner peripheral wall of the tire casing 6. The peripheral portion 70 of the tire casing supporting ring is formed with pairs of oppositely disposed lateral extensions 71 which are curved to conform to the curvature of the inner faces of the side portions of the associated tire casing. These extensions 71 will brace the side walls of the tire casing against inward flexure under normal conditions but of course are sufficiently resilient to yield under undue pressure.

A fragmentary portion of another modified form of tire casing supporting ring is shown in Figure 8 and comprises a peripheral portion 72 similar to the peripheral portion 70 of the form of ring shown in Figure 7. The peripheral portion 72 of the ring shown in Figure 8 is formed with pairs of oppositely disposed relatively long side extensions 73 which have the form of bracing fingers and are curved for part of their length from their juncture with the peripheral portion 72 to conform to the curvature of the inner faces of the side portions of the associated tire casing and then are bent laterally inward and then radially outward so that the free end portions of the oppositely disposed spacing fingers abut each other at 74 in the vertical plane of the longitudinal median line of the peripheral portion 72 of the tire casing supporting ring. It will be understood that each of the forms of tire casing supporting rings may comprise any desirable number of cooperative sections to permit a desirable expansion and contraction of the tire casing supporting ring circumferentially.

The modification shown in Figure 9 includes a spring supporting ring 77 within the tire casing 6 and a coil spring 78 disposed within the tire casing between the ring 77 and the beaded edge portions 5 of the tire casing. The coil spring 78 extends circumferentially of the tire casing and practically fills the tire casing. Arcuately curved rods, such as indicated at 79, may be provided at intermediate points within the coil spring 78 and may be secured to inner portions of convolutions of the coil spring by rivets 80 or like fastening devices. Alined radial openings such as indicated at 81 and 82, respectively, are provided in the wheel felly 2 and the rim 3 inwardly of each rod 79. These radial openings are elongated circumferentially of the wheel so that a hook 83 at the outer end of an associated fastening rod 84 may be projected outwardly through the openings 81—82 when the hook 83 is turned at right angles from its position of insertion through the said openings to the position shown in Fig. 9 and thereafter engaged on the rod 79. A washer 85 fits on the rod 84 against the felly 2 and a nut 86 is screwed on the rod 84 against the washer 85 and is tightened to draw the coil spring 78 against the edge portions of the tire casing, whereby the latter will be held in place on the rim 3.

The coil spring last described may be formed in a single piece as shown in Figure 9 or may comprise a plurality of cooperative sections 78ª, as in Figure 10 in which event the rods 79 will extend into the adjacent end portions of adjacent sections 78ª and the end convolutions of the sections 78ª are formed as rings 87.

Obviously, the invention is susceptible of embodiment in forms other than those which are illustrated in the accompanying drawings, and I therefore consider as my own all such modifications and adaptations thereof as fairly fall within the scope of the appended claims.

I claim:—

1. A spring tire for vehicle wheels comprising a circumferentially expansible and contractile supporting ring adapted to be disposed within a tire casing, radial rods threaded through spaced radial openings in the rim of a wheel, and longitudinally bowed spring members swivelly attached intermediate the ends to the outer ends of said rods, and adapted to exert pressure at their extremities against the inner peripheral face of said supporting ring.

2. A spring tire for vehicle wheels comprising a circumferentially expansible and contractile supporting ring adapted to be disposed within a tire casing, spaced radial adjusting rods threaded through openings in the rim of a wheel, and semi-elliptic spring members swivelly connected intermediate their ends with the outer ends of said adjusting rods, the concavely curved faces of said semi-elliptic spring members being turned outward, and rollers on the extremities of said semi-elliptic spring members in contact with the inner peripheral face of said supporting ring.

3. A spring tire for vehicle wheels comprising a supporting ring comprising a plurality of cooperative sections having complementarily beveled meeting end portions, compression spring means urging adjacent sections of said ring apart and tending to expand said ring circumferentially, and adjustable spring means for resiliently supporting said ring on the rim of a wheel.

4. In a spring tire for vehicle wheels, a supporting ring adapted to be disposed in the tire casing, said ring comprising a plurality of cooperative sections having complementarily beveled meeting end portions, a plate secured to the inner face of one of two meeting end portions of adjacent sections of said ring, said plate extending beyond the adjacent end of the supporting section, means on the inner face of the other meeting end portion of said two adjacent end sections cooperating with said meeting end portions of the said sections to produce a socket in which the extending end portion of the first named plate may slide, and compression spring means between said plates.

5. In a spring tire for vehicle wheels, a ring adapted to be disposed within a tire casing, said ring comprising a plurality of cooperating sections, the meeting ends of adjacent sections being complementarily beveled, a plate on the inner face of one of said meeting ends of adjacent sections, said plate extending beyond the adjacent end of the section on which it is supported, a second plate on the inner face of the other of said adjacent sections, said second named plate having the outer end portion thereof spaced inwardly from its support to overlap the extending end portion of the first named plate when the beveled end portions of said adjacent sections are fully lapped, said plates having inwardly extending lugs produced thereon, and a compression spring disposed between the lugs on said plates and acting to urge said adjacent sections apart.

6. In a spring tire for vehicle wheels, a ring adapted to be disposed within a tire casing, said ring comprising a plurality of cooperating sections, the meeting ends of adjacent sections being complementarily beveled, a plate on the inner face of one of said meeting ends of adjacent sections, said plate extending beyond the adjacent end of the section on which it is supported, a second plate on the inner face of the other of said adjacent sections, said second named plate having the outer end portion thereof spaced inwardly from its support to overlap the extending end portion of the first named plate when the beveled end portions of said adjacent sections are fully lapped, said plates having inwardly extending lugs produced thereon, and a compression spring disposed between the lugs on said plates and acting to urge said adjacent sections apart, the outer end portion of said second named plate having flanges extending at the side edges of the extending end portion of the first named plate.

LITCH J. SWARTZ.